US008666964B1

(12) United States Patent
Alpert

(10) Patent No.: US 8,666,964 B1
(45) Date of Patent: Mar. 4, 2014

(54) MANAGING ITEMS IN CRAWL SCHEDULE

(75) Inventor: Jesse L. Alpert, Albany, CA (US)

(73) Assignee: Google Inc., Mountain View, CA (US)

( * ) Notice: Subject to any disclaimer, the term of this patent is extended or adjusted under 35 U.S.C. 154(b) by 1592 days.

(21) Appl. No.: 11/113,820

(22) Filed: Apr. 25, 2005

(51) Int. Cl.
*G06F 7/00* (2006.01)
(52) U.S. Cl.
USPC .......................................... 707/709; 707/710
(58) Field of Classification Search
None
See application file for complete search history.

(56) References Cited

U.S. PATENT DOCUMENTS

| | | | |
|---|---|---|---|
| 5,898,836 A | 4/1999 | Freivald et al. | |
| 6,012,087 A | 1/2000 | Freivald et al. | |
| 6,219,818 B1 | 4/2001 | Freivald et al. | |
| 6,285,999 B1 | 9/2001 | Page | |
| 6,321,265 B1 | 11/2001 | Najork et al. | |
| 6,351,755 B1 | 2/2002 | Najork et al. | |
| 6,418,433 B1 | 7/2002 | Chakrabarti et al. | |
| 6,418,453 B1 | 7/2002 | Kraft et al. | |
| 6,424,966 B1 | 7/2002 | Meyerzon et al. | |
| 6,463,430 B1 * | 10/2002 | Brady et al. ....................... | 707/3 |
| 6,547,829 B1 | 4/2003 | Meyerzon et al. | |
| 6,594,662 B1 | 7/2003 | Sieffert et al. | |
| 6,631,369 B1 | 10/2003 | Meyerzon et al. | |
| 6,638,314 B1 | 10/2003 | Meyerzon et al. | |
| 6,701,350 B1 | 3/2004 | Mitchell | |
| 6,751,612 B1 | 6/2004 | Schuetze et al. | |
| 6,757,669 B1 | 6/2004 | Adar et al. | |
| 6,763,362 B2 * | 7/2004 | McKeeth ................... | 707/104.1 |
| 7,080,073 B1 * | 7/2006 | Jiang et al. ......................... | 707/7 |
| 7,171,619 B1 | 1/2007 | Bianco | |
| 7,257,594 B2 | 8/2007 | Tamboli et al. | |
| 7,299,219 B2 | 11/2007 | Green et al. | |
| 7,305,610 B1 | 12/2007 | Dean et al. | |
| 7,308,643 B1 | 12/2007 | Zhu et al. | |
| 7,310,632 B2 | 12/2007 | Meek et al. | |
| 7,328,401 B2 | 2/2008 | Obata et al. | |
| 7,475,069 B2 | 1/2009 | Blackman et al. | |
| 7,509,315 B1 | 3/2009 | Alpert et al. | |
| 7,574,433 B2 | 8/2009 | Engel | |
| 7,680,773 B1 | 3/2010 | Acharya et al. | |
| 7,725,452 B1 | 5/2010 | Randall | |
| 7,987,172 B1 | 7/2011 | Carver | |
| 8,042,112 B1 | 10/2011 | Zhu et al. | |
| 8,095,419 B1 | 1/2012 | Kapur | |
| 2002/0023158 A1 * | 2/2002 | Polizzi et al. .................. | 709/227 |
| 2002/0032740 A1 * | 3/2002 | Stern et al. ..................... | 709/206 |

(Continued)

FOREIGN PATENT DOCUMENTS

WO 01/50320 A1 7/2001
WO 01/86507 A1 11/2001

OTHER PUBLICATIONS

Fetterly et al., A Large-Scale Study of the Evolution of Web Pages, May 20-24, 2003, http://research.microsoft.com/research/sv/sv-pubs/p97-fetterly/p97-fetterly.pdf.

(Continued)

*Primary Examiner* — Robert Beausoliel, Jr.
*Assistant Examiner* — Nirav K Khakhar

(57) ABSTRACT

Determining a schedule for recrawling pages is disclosed. A crawling schedule that specifies a due date at which each page is to be crawled is determined according to a first scheme. A set of pages that includes one or more pages each of which has a due date that has passed is determined. The set of pages is ordered according to a second scheme.

20 Claims, 6 Drawing Sheets

(56) References Cited

U.S. PATENT DOCUMENTS

| | | | |
|---|---|---|---|
| 2002/0052928 | A1 | 5/2002 | Stern et al. |
| 2002/0087515 | A1 | 7/2002 | Swannack et al. |
| 2002/0099602 | A1 | 7/2002 | Moskowitz et al. |
| 2004/0044962 | A1 | 3/2004 | Green et al. |
| 2004/0225642 | A1* | 11/2004 | Squillante et al. ............ 707/3 |
| 2004/0225644 | A1 | 11/2004 | Squillante et al. |
| 2005/0071766 | A1 | 3/2005 | Brill et al. |
| 2005/0192936 | A1* | 9/2005 | Meek et al. ............ 707/3 |
| 2006/0235858 | A1 | 10/2006 | Joshi et al. |
| 2006/0277175 | A1 | 12/2006 | Jiang et al. |
| 2011/0258176 | A1 | 10/2011 | Carver |

OTHER PUBLICATIONS

Wolf et al., Optimal Crawling Strategies for Web Search Engines, May 2002, ACM, pp. 136-147.
Arasu et al., Searching the Web, Aug. 2001, ACM Transactions on Internet Technology (TOIT), ACM Press, vol. 1, Issue 1, pp. 2-43.
U.S. Appl. No. 11/113,819, filed Apr. 25, 2005 (Auerbach et al.).
Hirai, J. et al., "WebBase: A Repository of Web Pages", Computer Networks, vol. 33, Issues 1-6 (Jun. 2000), 22 pages.
Douglis, F. et al., "The AT&T Internet Difference Engine: Tracking and Viewing Changes on the Web", World Wide Web, vol. 1, No. 1 (Jan. 1998), 29 pages.
Shkapenyuk, V. et al., "Design and Implementation of a High Performance Web Crawler", Proceedings of the 18th International Conference on Data Engineering ICDE (Mar. 1, 2002), pp. 357-368.
Douglis, F. et al., "Rate of Change and Other Metrics: A Live Study of the World Wide Web", USENIX Symposium on Internetworking Technologies and Systems (Dec. 1997), pp. i and 1-13.
Brandman, O. et al., "Crawler-Friendly Web Servers", ACM SIGMETRICS Performance Evaluation Review, vol. 28, Issue 2 (Sep. 2000), 16 pages.
Brin, S. et al., "The Anatomy of a Large-Scale Hypertextual Web Search Engine", In Proceedings of the 7th International World Wide Web Conference, vol. 30, Issue 1-7 (Apr. 1998), 20 pages.
Haveliwala, T. H., "Topic-Sensitive PageRank", In Proceedings of the 11th International World Wide Web Conference (May 7-11, 2002), 10 pages.
Jeh, G. et al., "Scaling Personalized Web Search", Proceedings of the 12th international conference on World Wide Web (2003), 35 pages.
Kamvar, S et al., "Exploiting the Block Structure of the Web for Computing PageRank", Stanford Univ. Technical Report (2003), 13 pages.
Baeza-Yates, R. et al., "Balancing Volume, Quality and Freshness in Web Crawling", Soft Computing Systems—Design Management and Applications (2002), 10 pages.
Suel, T. et al., "ODISSEA: A Peer to Peer: Architecture for Scalable Web Search and Information Retrieval", In 6th International Workshop on the Web and Databases WebMD (Jun. 12-13, 2003), 6 pages.
Ali, H. et al., "What Changed? Measuring Document Change in Web Crawling for Search Engines", International symposium on string processing and information retrieval SPIRE 2003 (Oct. 8-10, 2003), pp. 28-42.
Final Office Action for U.S. Appl. No. 11/113,819, mailed Jan. 23, 2008, 16 pages.
Final Office Action for U.S. Appl. No. 11/113,819, mailed Nov. 5, 2008, 20 pages.
Non-Final Office Action for U.S. Appl. No. 11/113,819, mailed Jun. 23, 2008, 15 pages.
Non-Final Office Action for U.S. Appl. No. 11/113,819, mailed Nov. 23, 2009, 18 pages.
Non-Final Office Action for U.S. Appl. No. 11/113,819, mailed Sep. 7, 2007, 12 pages.
U.S. Appl. No. 11/113,819, filed Apr. 25, 2005, 22 pages.
U.S. Appl. No. 12/410,440, filed Mar. 24, 2009, 21 pages.
Advisory Action for U.S. Appl. No. 13/032,578, mailed Oct. 4, 2012, 7 pages.
Final Office Action for U.S. Appl. No. 13/032,578, mailed Jul. 18, 2012, 16 pages.
Final Office Action Response for U.S. Appl. No. 13/032,578, filed Sep. 18, 2012, 8 pages.
Office Action Response for U.S. Appl. No. 13/183,914, filed Sep. 25, 2012, 7 pages.
Notice of Allowance for U.S. Appl. No. 13/183,914, mailed Jul. 16, 2012, 18 pages.
Fagin, "Searching the Workplace Web", Proceedings of the 12th International Conference on World Wide Web, May 20-24, 2003, pp. 366-375.
Fontoura, "High Performance Index Build Algorithms for Intranet Search Engines", Proceedings of the 30th VLDB Conference, 2004, pp. 1122-1133.
Notice of Allowance for U.S. Appl. No. 13/032,578, mailed Nov. 5, 2012, 26 pages.
Notice of Allowance for U.S. Appl. No. 13/183,914, mailed Nov. 2, 2012, 7 pages.
RCE for U.S. Appl. No. 13/032,578, filed Oct. 17, 2012, 3 pages.
Non-Final Office Action for U.S. Appl. No. 13/032,578, mailed Feb. 16, 2012, 17 pages.
Non-Final Office Action Response for U.S. Appl. No. 13/032,578, filed May 15, 2012, 8 pages.
Final Office Action for U.S. Appl. No. 11/113,819, mailed Aug. 20, 2010, 19 pages.
Non-Final Office Action for U.S. Appl. No. 12/410,440, mailed Sep. 2, 2010, 10 pages.
Non-Final Office Action for U.S. Appl. No. 12/410,440, mailed Jun. 14, 2010, 15 pages.
U.S. Appl. No. 13/032,578, filed Feb. 22, 2011, 19 pages.
Notice of Allowance for U.S. Appl. No. 12/410,440, mailed Mar. 25, 2011, 10 pages.

* cited by examiner

| | URL | Time Crawled | Hash | |
|---|---|---|---|---|
| 208 | internal.company.com/index.html | 01/01/2005 13:45:22 | abc123 | 212 |
| 214 | internal.company.com/important.doc | 01/09/2005 13:45:23 | def456 | |
| 220 | internal.company.com/archieve.text | 07/12/2004 13:45:24 | ghi789 | |
| | ... | ... | ... | |

FIG. 2A

| | URL | Time Crawled | Hash | |
|---|---|---|---|---|
| 208 | internal.company.com/index.html | 01/03/2005 13:45:22 | jkl121 | 230 |
| 214 | internal.company.com/important.doc | 01/10/2005 13:45:23 | aaa222 | |
| 220 | internal.company.com/archieve.text | 01/10/2005 13:45:24 | ghi789 | |
| | ... | ... | ... | |

FIG. 2B

|  | URL | Importance | Last Crawl | Change Rate |  |
|---|---|---|---|---|---|
| 310 | internal.company.com/index.html | 9 | 01/03/2005 13:45:22 | 2 days | 316 |
| 312 | internal.company.com/important.doc | 10 | 01/10/2005 13:45:23 | 1 day | |
| 326 | internal.company.com/archieve.text | 1 | 01/10/2004 13:45:24 | 180 days | |
|  | ... |  | ... | ... | |

302 = URL, 304 = Importance, 306 = Last Crawl, 308 = Change Rate

FIG. 3

MANAGING ITEMS IN CRAWL SCHEDULE

BACKGROUND OF THE INVENTION

Search appliances, such as are used in conjunction with an intranet, typically receive an initial list of URLs to crawl, crawl those URLs, and create an index based on the documents retrieved. Recrawls are typically performed in sequence—the first page crawled is also the first page recrawled. The result can be that less important pages and pages which change infrequently that appear earlier in the URL list are crawled before other, more important pages. Since a crawler can only crawl a finite number of pages in a given time period, situations can arise where less important or unchanged pages may be crawled to the exclusion of more important or changed pages. There exists a need to be able to schedule when pages should be recrawled.

BRIEF DESCRIPTION OF THE DRAWINGS

Various embodiments of the invention are disclosed in the following detailed description and the accompanying drawings.

FIG. 2A illustrates an embodiment of crawl records.

FIG. 2B illustrates an embodiment of additional crawl records.

FIG. 3 illustrates an embodiment of a table maintained by a crawl manager.

DETAILED DESCRIPTION

Managing items in a crawl schedule is disclosed. In one embodiment, a search appliance is configured to manage the items in the crawl schedule. A search appliance, such as the Google Search Appliance, is typically a self-contained sealed computer which is installed within a network, such as a corporate intranet. The search appliance indexes documents on the intranet and delivers search results. As part of this process, documents are crawled and recrawled. In one embodiment, a recrawl schedule, specifying when a page or group of pages should be recrawled, is created. It is determined whether any pages are "overdue" to be crawled. If so, the crawler may crawl those overdue pages in the order in which they are received, or it may crawl them in a different order, such as by crawling the overdue pages in order of importance.

Figure 1:
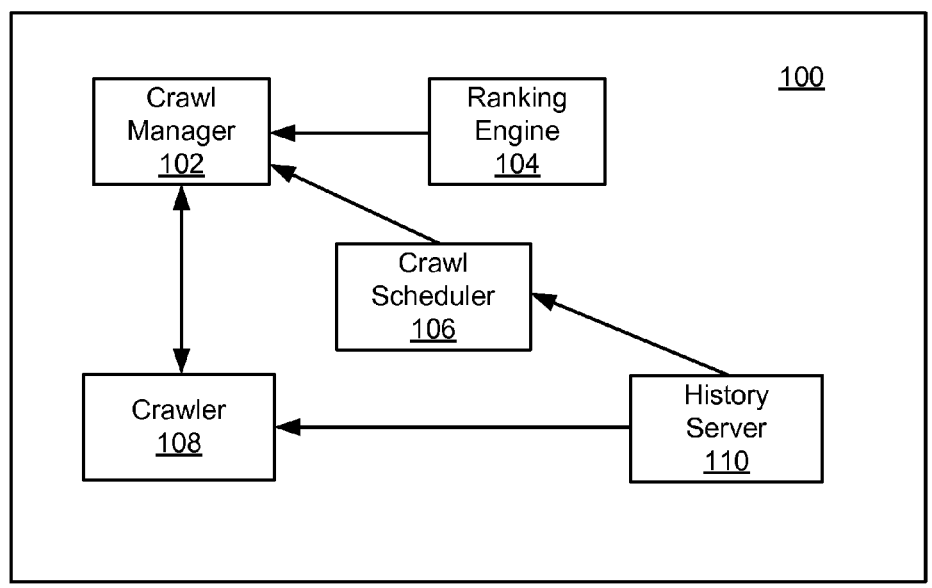
FIG. 1 illustrates an embodiment of a search appliance.

FIG. 1 illustrates an embodiment of a search appliance. In this example, a crawl manager 102, a ranking engine 104, a crawl scheduler 106, a crawler 108, and history server 110 are shown. Other elements typically included in a search appliance, such as a repository, an indexer, and a search server, are not shown but may be included. As described more fully below, in this embodiment, crawl manager 102 maintains information about each URL of which it is aware. This information can be conceptualized as being stored in a table by crawl manager 102. The actual storage of the information may take any appropriate form. Based on the contents of the table, crawl manager 102 selects and sends URLs to crawler 108 to crawl. To help populate the table, crawl manager 102 receives ranking information from ranking engine 104 and estimated change periods from crawl scheduler 106.

Crawl scheduler 106 estimates how frequently the document located at a particular URL changes (hereinafter a "change period"), based in part on data obtained from history server 110. For example, a personal web page may typically change once a week or once a month. A blog may typically change multiple times a day, and an archive may typically change once every six months, or more. As described more fully below, the change period of a particular URL is used when calculating when it should next be crawled.

In this embodiment, crawler 108 performs multiple functions, including requesting URLs from crawl manager 102, fetching the documents at those URLs, and processing retrieved documents, for example, to extract link information. Documents can include Web pages, text files, multimedia files, object features, link structure, and other content. In some embodiments, some of the functions of crawler 108 may be performed by other, separate components.

While the system depicted in FIG. 1 is a search appliance, the claimed invention could be practiced in a variety of information retrieval contexts. For example, intranet search engines, Internet search engines, and intrasite search engines may all replace the system of FIG. 1 or operate in conjunction with the system of FIG. 1.

FIG. 2A illustrates an embodiment of crawl records. The example shown is a representation of some of the data contained in a record. In this example, the crawl records are maintained by history server 110 which shares the information with crawl scheduler 106. Each time a page is crawled, such as by crawler 108, a checksum for the newly retrieved page is calculated and stored. If the checksum is different from the previously stored checksum, this indicates that the content of the page has changed.

The records shown contain, for each URL (202), the time the URL was crawled (204) and a checksum (206) of the document located at the URL at the time it was crawled. URL 202 is represented here and throughout as a URL for purposes of clarity. In some embodiments, URL 202 may be a URL fingerprint, a document ID, or some other fingerprint or pointer to a URL, rather than a URL itself. Similarly, the time crawled may be stored in a variety of ways and is represented here in date/time format. The document checksum may be created in a variety of ways, such as by using one of several different hash functions, and/or may employ the HTTP If-Modified-Since header field.

FIG. 2B illustrates an embodiment of additional crawl records. In this example, for each URL, two records (depicted in FIGS. 2A and 2B) are kept. In some embodiments, more records may be kept to better estimate the change period of a page. In this example, URL 208 changed at least once in two days. This is known because the hash has changed from "abc123" (212) to "jkl121" (230), indicating that the page content has changed at least once between time 210 and 228. Similarly, URL 214 changed at least once in the last day, and URL 220 has not changed in approximately six months, if not longer. Thus, based on these values, in this example, crawl scheduler 106 would estimate change periods of two days, one day, and six months, respectively, for each URL. As discussed below, it is possible that a URL, such as URL 208, may change more frequently than is observed by history server 110 and crawl scheduler 106.

FIG. 3 illustrates an embodiment of a table maintained by a crawl manager. The example shown is a representation of some of the data contained in the table maintained by crawl manager 102. For each URL (302), an importance rank (304), the time the URL was last crawled (306), and the estimated change period (308) are stored. An importance rank is the relevance of a page, independent of a query. In this example, the higher the value of the importance rank, the more important the page. Thus, URL 312 has a higher importance than URL 310, and both URLs have a significantly higher importance rank than URL 326. In some embodiments the importance rank is based on PageRank®. In this example, URL 310 has an importance rank of 9 and was last crawled on Jan. 3, 2005. URL 310 is estimated to change once every two days.

Figure 4:
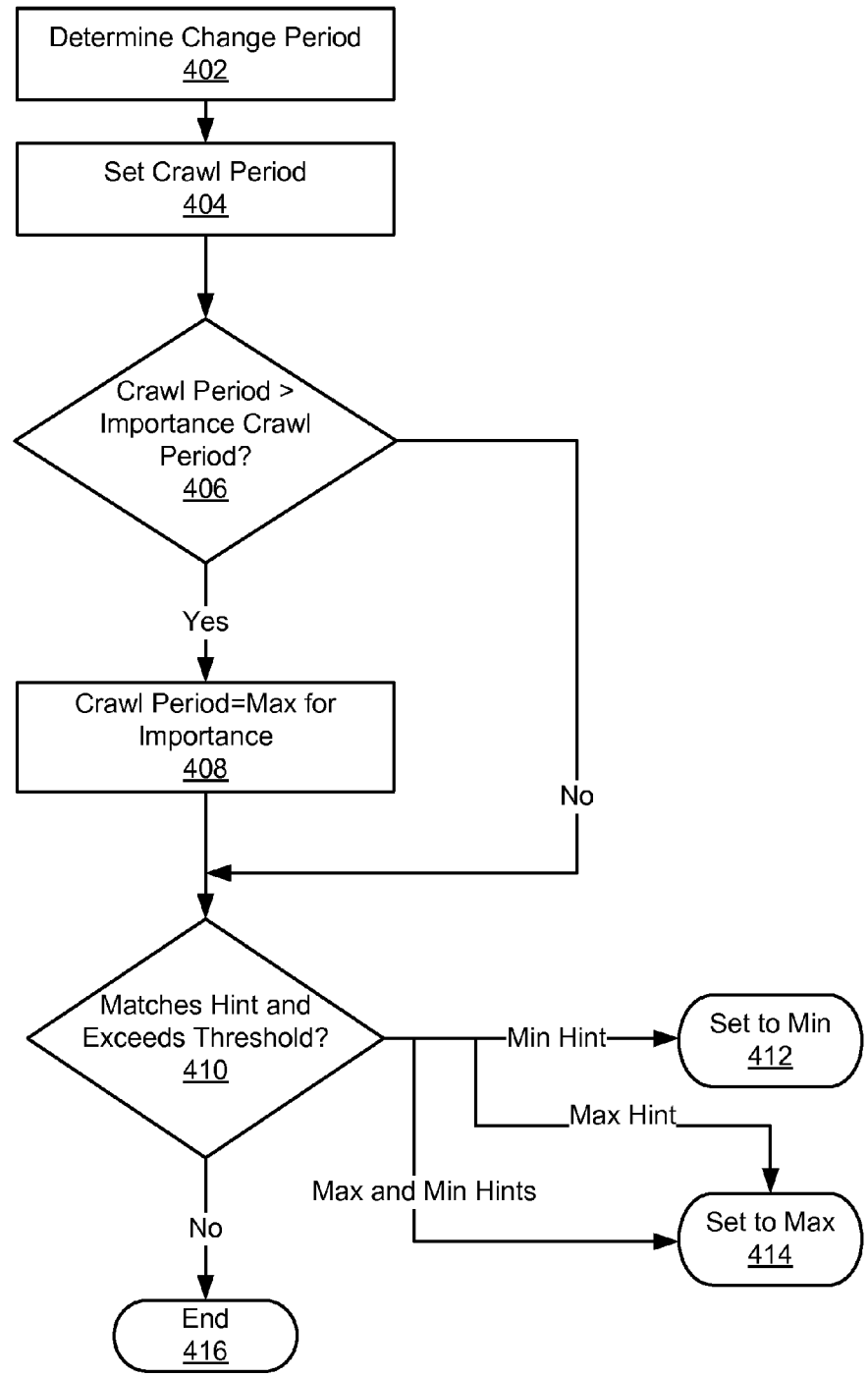
FIG. 4 illustrates an embodiment of a process for scheduling a recrawl.

FIG. 4 illustrates an embodiment of a process for scheduling a recrawl. In the example shown, the process begins at 402 when the change period of a URL is estimated. For example, at 402, crawl scheduler 106 compares the hash value 212 and time crawled 210 to hash value 230 and time crawled 228 to estimate that the change period of URL 208 is two days (316).

In some cases, a page may change more frequently than its estimated change rate. This can occur, for example, if a page changes every day, but is only crawled every seven days. If a page has changed every time it is crawled, the search appliance may erroneously believe that the crawler is crawling the page at precisely the correct frequency, and not that the page has changed several times between crawls. To help remedy this, at 404, a crawl period is set, based on the change period. In this embodiment, the crawl period is set to half of the change period. For example, while URL 310 is estimated to change every two days, the crawl period of URL 310 is one day. In other embodiments, other relations are used as appropriate. In some embodiments, crawl periods are "bucketized" into groups such as daily, weekly, monthly, and yearly.

At 406, it is determined whether the crawl period of the URL, such as URL 310, exceeds a threshold that is set for the importance rank of the page (hereinafter the "importance crawl period"). Use of an importance rank may be especially helpful when a search appliance is faced with the daunting task of recrawling millions of pages. Pages that are more important should generally be crawled more frequently than pages that are less important, even if some of the important pages may change less frequently than some of the less important pages.

For example, URL 310 has an importance rank of 9, indicating that it is a very important page. The importance crawl period for a URL having an importance rank of 9 may be 4 days, where the importance crawl period for a URL having an importance rank of 1, such as URL 326, may be 4 months. Using URL 310 as an example, at 406 it is determined that the crawl period for URL 310 (1 day) is less than its importance crawl period (4 days for a document having an importance rank of 9), thus no change is necessary. If URL 310's change period had been larger, such as 20 days, and its crawl period had thus been 10 days, then at 408 URL 310's crawl period would be set to the maximum importance crawl period, 4 days.

At 410, the URL is compared against a list of "hints." In this example, hints are defined by an administrator and take the form of "begins <string>" such as "begins www.google.com/important" or "ends <string>" such as "ends .doc," or they could be represented other ways, such as by use of regular expressions. In this example, there are two sets of hints, minimum hints and maximum hints. Similar to the importance crawl period, hints provide overriding crawl periods for documents that match them. If a URL does not match a hint, or if it matches a hint, but its crawl period is within the threshold of the hint, the process ends at 416.

If a URL matches a minimum hint and its crawl period is shorter than the value specified for the minimum, its crawl period is set to the value specified for the hint (412). For example, if a URL has a crawl period of 5 days, but matches a hint that specifies a minimum of 20 days, at 412, the URL's crawl period will be set to 20 days. A mailing list archive is one example of when a minimum hint may be used. In that case, an administrator knows that the document may not change for months. While the crawler may eventually determine this, without the aid of a hint, it may waste a great deal of time recrawling the archive before reaching this conclusion. Similarly, the archive may have a very high importance value which could skew the crawler to needlessly recrawl it frequently if a hint were not employed. Hints may also be employed on pages that are automatically generated and/or contain dynamically generated elements that result in the page having a different checksum every time it is crawled. Without a minimum, an unimportant page with a clock may be erroneously crawled faster and faster to an absurd level such as "crawl once every 3 seconds." A global minimum can also be imposed on all pages, such as "once an hour" to help prevent this scenario.

If a URL matches a maximum hint and its crawl period is longer than the value specified for the maximum, its crawl period is set to the value specified for the hint (414). For example, if a URL has a crawl period of 5 days, but matches a hint that specifies a maximum of 1 day, at 414, the URL's crawl period will be set to 1 day. A company directory is one example of when a maximum hint may be used. While the page may change only infrequently, when it does change, it may be desirable for the changes to be crawled promptly, and thus, the page should be crawled every day. Corporate handbooks provide a similar example. Maximum hints can also be used to help promptly crawl pages which are known, for example by an administrator, to change frequently. For example, without a hint, if the search engine is faced with the prospect of crawling several million pages, it may take the crawler a long time to determine that a particular page changes every 12 hours.

In some embodiments, rather than having minimum and maximum hints, ranges of hints may be implemented, such as "crawl these pages every day," "crawl these pages once a week," and "crawl these pages every three months." In some embodiments, if a pattern is matched, rather than defaulting to a minimum or maximum value, the crawl period for a URL can be set to specific time (crawl on March $3^{rd}$ at 14:23), or could be based on other factors, such as PageRank.

If both a maximum and a minimum hint are matched, in this example, the URL is treated as having matched a maximum hint. This errs on the side of crawling the URL more frequently. In other embodiments, if both maximum and minimum hints are matched, it may be proper to err on the side of crawling the URL less frequently.

Once a crawl period has been selected and any modifications to the crawl period have been made, a crawl schedule can be created as described in further detail below.

Figure 5:
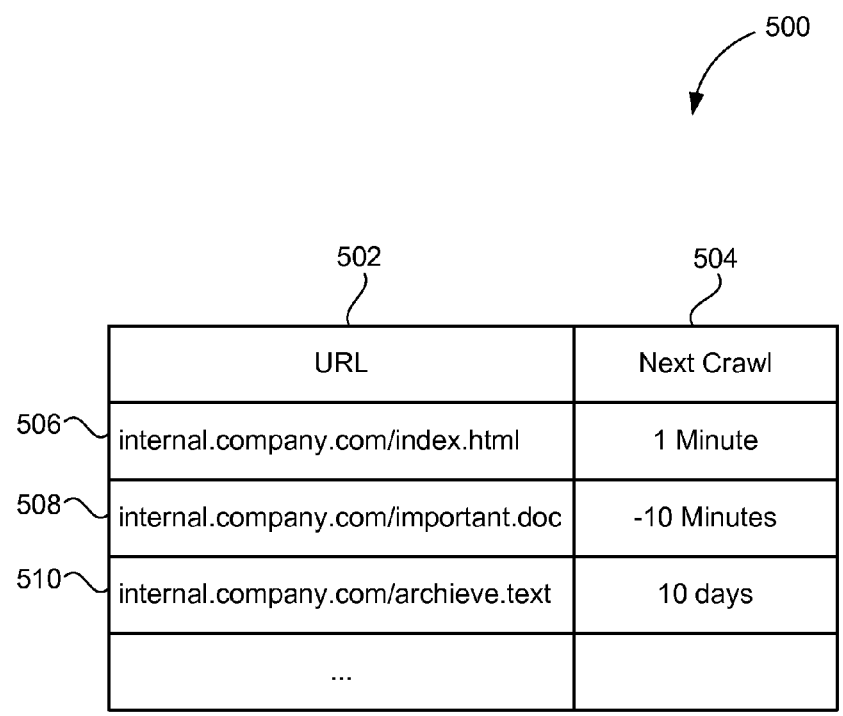
FIG. 5 illustrates an embodiment of a crawl schedule.

FIG. 5 illustrates an embodiment of a crawl schedule. The example shown is conceptually represented as a table containing a list of URLs 502 and their respective recrawl times (504). The recrawl time is calculated as the last crawl, such as last crawl 306, added to the crawl period, such as is calculated through the process of FIG. 4. In the example shown, URL 506 is scheduled to be crawled in one minute, URL 510 is scheduled to be crawled in 10 days, and URL 508 should have been crawled 10 minutes ago. That is, URL 508 is 10 minutes overdue.

Figure 6:
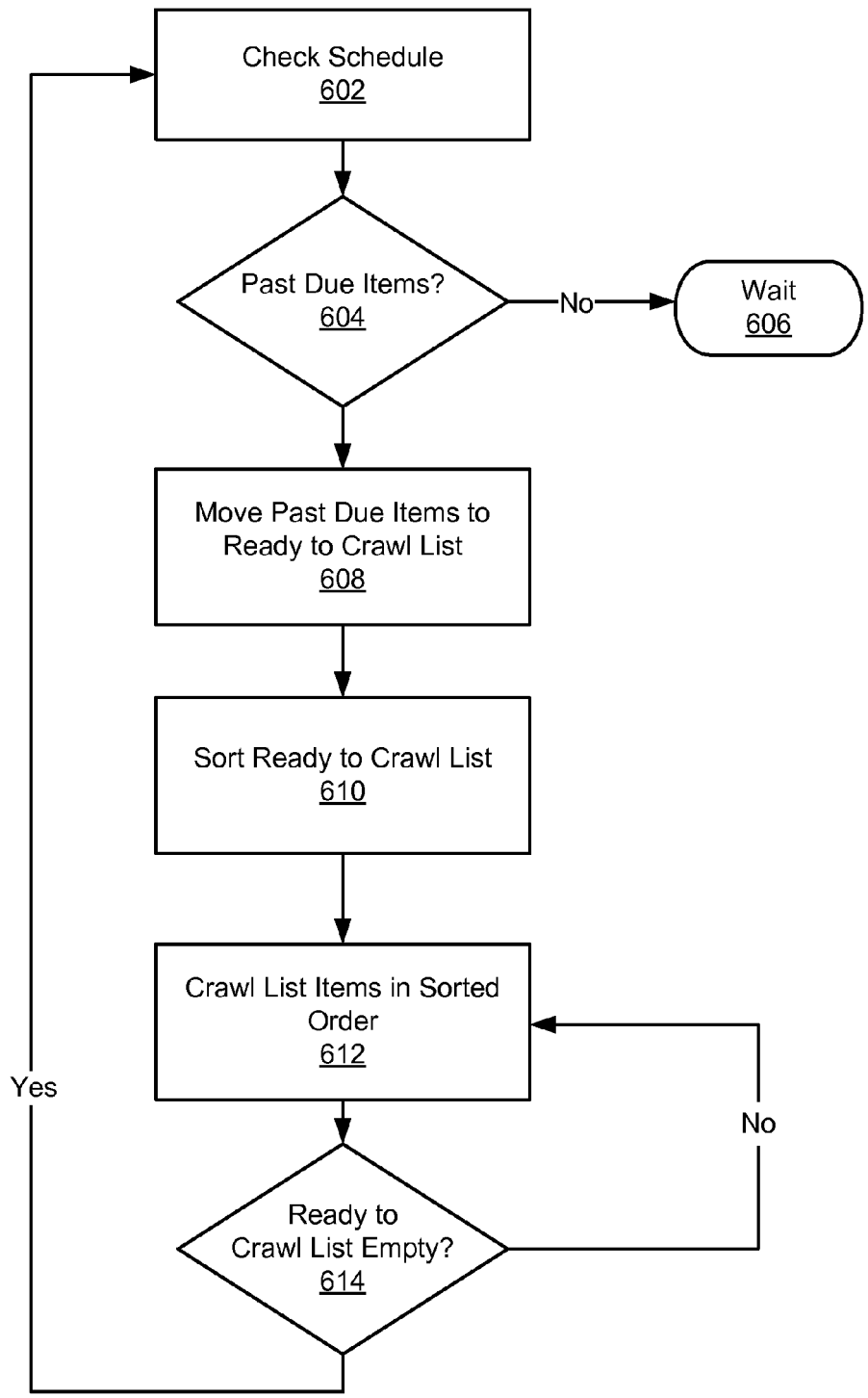
FIG. 6 illustrates an embodiment of a process for crawling a set of URLs.

FIG. 6 illustrates an embodiment of a process for crawling a set of URLs. In the example shown, the process begins at 602 when crawl manager 102 checks a schedule, such as schedule 500. At 604, crawl manager 102 determines whether any items in the schedule are due or overdue for a recrawl (hereinafter "ready to crawl"), such as URL 508.

If there are no past due items, crawl manager 102 waits, for example, for a specified amount of time, and begins the process at 602 again. This typically occurs when the URLs aren't changing very quickly, aren't very important, or were crawled sufficiently recently that little benefit is gained by crawling them again so soon.

In some embodiments, at 606, crawl manager 102 waits for an event, such as a command from an administrator to check the schedule, or for the system to reach a particular state, such as a load of a particular value. In some embodiments, if there are no past due items, rather than waiting, crawl manager may look for items with due dates in the near future, such as "crawl in 5 minutes" and treat them as ready to crawl items. In some embodiments, rather than waiting, crawl manager 102 may attempt to avoid future bottlenecks by determining whether a large number of items will become due within a short amount of time, and treating them as ready to crawl items. In some embodiments, if there are no past due items, crawl manager 102 may select random URLs to crawl, or may crawl important pages.

At 610, the ready to crawl list is optionally sorted. Typically, the list may be sorted in chronological order. Thus, the most overdue items will be recrawled before less overdue items. Depending on factors such as how large the past due list is, how overdue the oldest items on the list are, server load, network conditions, and so on, it may be desirable to sort the past due list in an alternate crawl order. Typically, if a page has a crawl period lower than the amount of time that crawler 108 behind, the page will be crawled at crawler 108's amount of tardiness. For example, if a page changes every hour, and crawler 108 is eight hours behind, crawler 108 will attempt to crawl the page every eight hours, rather than every hour until crawler 108 is back on schedule. In some embodiments, crawl manager 102 has different measures of how far behind it is, and which sort order is used depends on which level of tardiness has been reached.

In one example, when crawler 108 is only slightly behind, the list is sorted in chronological, due date order. For example, so long as crawler 108 is no more than three hours behind (the oldest item in the list was due no more than three hours ago), crawler 108 continues to crawl the items from most overdue to least overdue. When crawler 108 slips behind a threshold, for example, when crawler 108 is more than three hours behind, the ready to crawl list may be sorted at 610 by an alternate criterion, such as importance rank or PageRank. In this case a top fraction of pages is crawled and a bottom fraction of pages is ignored. For example, if sorted by PageRank, crawler 108 may crawl the top 80% rated documents, and discard the bottom 20% documents from its list.

Another alternate sorting method is to use a combination of importance rank and the due date. This combination may be implemented many ways as appropriate. One example for calculating in which order documents should be crawled in this sorting scheme is to multiply the importance rank of a URL by the number of minutes the URL is overdue for a crawl.

Another alternate sorting method is to use a combination of importance rank, due date, and change rate. For example, if crawler 108 is severely behind schedule, it may be desirable to focus on the documents that were crawled the longest ago, but change the most frequently, and are not unimportant pages.

Crawler 108 continues to crawl items at 612 until the ready to crawl list is empty at 614. Once the ready to crawl list is empty, the process repeats and the schedule is checked again at 602. In some embodiments, when crawler 108 is no longer at or above the threshold for sorting by alternate method, or, when the list is empty, crawl manager 102 may instruct crawler 108 to return to crawling pages in due date order.

Although the foregoing embodiments have been described in some detail for purposes of clarity of understanding, the invention is not limited to the details provided. There are many alternative ways of implementing the invention. The disclosed embodiments are illustrative and not restrictive.

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. While the invention is described in conjunction with a search appliance, the invention may be embodied in a web search engine, such as Google.com, and in other information retrieval systems. In general, the order of the steps of disclosed processes may be altered within the scope of the invention.

A detailed description of one or more embodiments of the invention has been provided above along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the above description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

What is claimed is:

1. A method of determining a schedule for recrawling items including:
    estimating, using a processor of one or more devices, a change period for each of a set of items to be crawled;
    generating, using a processor of the one or more devices, a crawl list of items where each item on the crawl list is overdue to be crawled in accordance with the change period for the item and with when the item was last crawled;
    selecting, using a processor of the one or more devices, a sorting method from multiple different sorting methods based on one or more different factors; and
    sorting, using a processor of the one or more devices, the crawl list prior to crawling the items on the crawl list using the selected sorting method.

2. The method of claim 1 where the sorting method is based, at least in part, on an importance rank assigned to each item.

3. The method of claim 1 where the sorting method is based, at least in part, on the change period estimated for each item.

4. The method of claim 1 where the sorting method is based, at least in part, on how overdue to be crawled is each item.

5. The method of claim 1 where the change period is estimated based on an importance rank assigned to the item.

6. The method of claim 1 where the item is a page or document stored on a network.

7. The method of claim 1 where the item is a page or document stored on a corporate intranet.

8. A system for crawling items in a network comprising:
one or more processors configured to:
estimate a change period for each of a set of items to be crawled;
generate a crawl list of items where each item on the crawl list is overdue to be crawled in accordance with the change period for the item and with when the item was last crawled;
select a sorting method from multiple different sorting methods based on one or more different factors; and
sort the crawl list prior to crawling the items on the crawl list using the selected sorting method.

9. The system of claim 8 where the sorting method is based, at least in part, on an importance rank assigned to each item.

10. The system of claim 8 where the sorting method is based, at least in part, on the change period estimated for each item.

11. The system of claim 8 where the sorting method is based, at least in part, on how overdue to be crawled is each item.

12. The system of claim 8 where the change period is estimated based on an importance rank assigned to the item.

13. The system of claim 8 where the item is a page or document stored on a network.

14. The system of claim 8 where the item is a page or document stored on a corporate intranet.

15. A search appliance comprising:
a crawl scheduler for estimating a change period for each of a set of items to be crawled; and
a crawl manager for generating a crawl list of items where each item on the crawl list is overdue to be crawled in accordance with the change period for the item and with when the item was last crawled, for selecting a sorting method from multiple different sorting methods based on one or more different factors and for sorting the crawl list prior to crawling the items on the crawl list using the selected sorting method.

16. The search appliance of claim 15 where the sorting method is based, at least in part, on an importance rank assigned to each item.

17. The search appliance of claim 15 where the sorting method is based, at least in part, on the change period estimated for each item.

18. The search appliance of claim 15 where the sorting method is based, at least in part, on how overdue to be crawled is each item.

19. The search appliance of claim 15 where the change period is estimated based on an importance rank assigned to the item.

20. The search appliance of claim 15 where the item is a page or document stored on a network.

\* \* \* \* \*